March 3, 1964
R. GILMONT
3,122,923
ABSOLUTE PRESSURE MEASURING DEVICE
Filed March 28, 1962
FIG.1
FIG.2
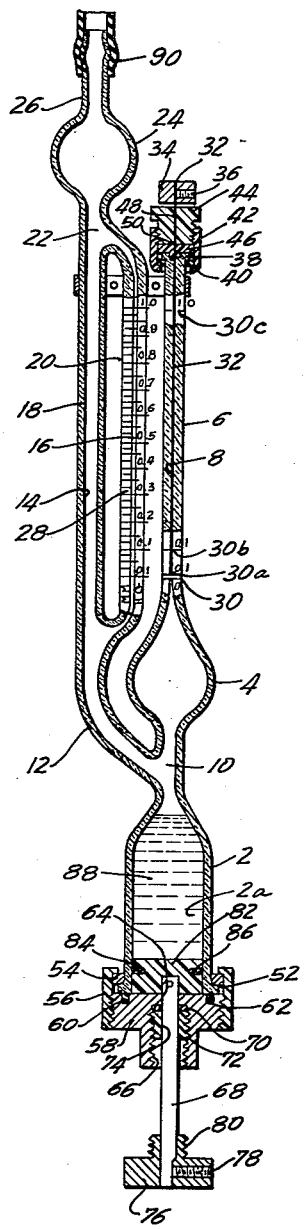
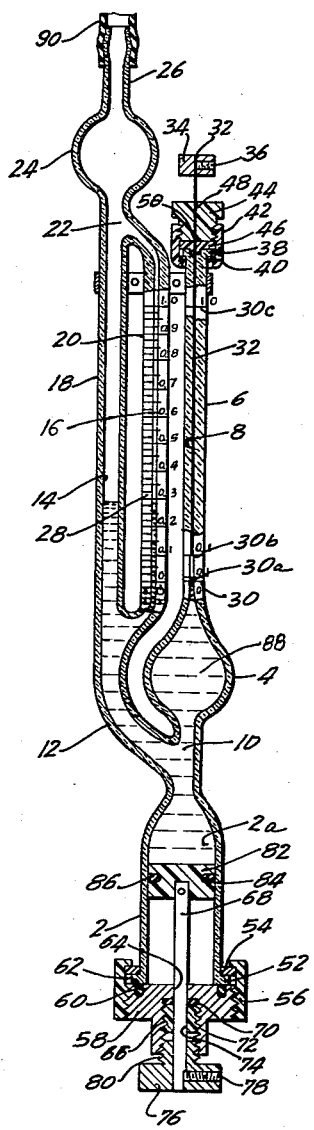
INVENTOR.
ROGER GILMONT
BY *James and Franklin*
ATTORNEYS

United States Patent Office 3,122,923
Patented Mar. 3, 1964

3,122,923
ABSOLUTE PRESSURE MEASURING DEVICE
Roger Gilmont, Douglaston, N.Y., assignor to Roger Gilmont Instruments, Inc., Great Neck, N.Y., a corporation of New York
Filed Mar. 28, 1962, Ser. No. 183,302
14 Claims. (Cl. 73—400)

The present invention relates to an improved construction for an absolute pressure measuring device capable of accurately measuring very low pressures, and more specifically applies to the construction of such a device of the McLeod type.

One common type of absolute pressure gauge subjects opposite ends of a U-shaped column of fluid such as mercury to different pressures, one being essentially at zero pressure, and measures the difference between those pessures in terms of the differences in height of the two arms of the fluid column, those differences in height being a measure of the absolute pressures applied to the top of the column of liquid in the arm containing the fluid under test. The accuracy of this type of instrument depends on the ability to measure the height difference, and as that difference decreases, as when very low pressures are to be measured, the utility of the instrument is adversely affected.

In gauges of the McLeod type very low pressures are measured by trapping an accurately predetermined volume of the gas the pressure of which is to be measured (hereinafter termed the "test gas") and compressing that volume of gas to a known extent. When the test gas volume is compressed its pressure will rise proportionately to its decrease in volume, as taught by Boyle's law. This increased pressure is large enough to be measured accurately in conventional manner by differential mercury column height, the initial pressure of the test gas being determined by taking into account the amount to which the initial volume of gas has been compressed. Thus, by knowing the initial volume of the trapped gas, the volume to which that gas has been compressed, and the pressure of the compressed gas, the initial pressure can be calculated.

The degree of compression which must be carried out is usually quite great, particularly if the gauge is to be capable of measuring initial pressures on the order of .01 mm. of mercury. As a result the quite rarified volume of test gas which is trapped is adapted to be forced into a capillary passage in order to be compressed sufficiently for measurement purposes. The trapping and compressing of the test gas is accomplished by means of a fluid such as mercury which is movable in the instrument between a standby position permitting the test gas to enter the trap chamber and an operative position in which it compresses the trapped gas and indicates the compressed pressure thereof.

It often occurs that the capillary passage becomes fouled, sometimes by foreign matter carried by the test gas and sometimes by small amounts of mercury which enter the capillary passage and resist dislodgement therefrom. Unless the capillary passage is cleaned the instrument becomes useless for accurate measurement. In most instances the capillary tube in which the rarified gas is compressed is permanently closed at one end, but which capillary tubes of this type cleaning is most difficult and sometimes virtually impossible. It has been proposed to utilize open-ended capillary passages to facilitate cleaning (see, for example, my article entitled "Improved McLeod Gauge" in Instruments and Control Systems, volume 33, No. 8, August 1960), but such constructions have involved the use of relatively tortuous paths for those capillary passages, thus making for difficulty in cleaning and making for appreciable difficulty in expense in initial manufacture.

The range of pressures which a given instrument is capable of measuring is determined by the degree to which the trapped volume of gas to be measured is compressed. The more rarified the gas is initially, the more it must be compressed in order to produce an accurately measurable final pressure. It is not unduly difficut to compress the gas to be measured into a smaller volume within a capillary passage, but that type of operation, at it has been proposed in the past either with closed or open-ended passages, requires either that the scale on which the level of the mercury in the cooperating arm of the gauge is read be physically movable to correspond to the specific location of the mercury level within the compression passage, that separate scales be provided for each different degree of compression of the test gas, or that suitable corrections be made arithmetically to the observed values on the scale before a true measurement value is obtained. Moreover, scales of that type usually must be non-linear. Linear scales are easier to read and less productive of mistakes, and the need to move a scale, or select the proper one of a plurality of scales, is a source of error as well as a source of trouble, inconvenience, and expense in manufacture.

Means must be provided for moving the mercury or other suitable liquid in the gauge between its standby and operative positions. One way in which this has been accomplished in the past is by means of a piston movable within a reservoir in the gauge, that reservoir being adapted to contain the requisite supply of mercury. In the past the pressure on both sides of that piston has been equalized, usually by providing complicated equilibrating passages for that purpose. This makes for ease of manipulation, but presents certain serious disadvantages. The piston can easily be pushed up, forcing mercury into the capillary tube, even when the gauge is not connected to a source of low pressure, and some of that mercury may remain stuck in the capillary passage, thus disabling the gauge until the situation is rectified.

It is the prime object of the present invention to devise a construction for a gauge of the type under discussion which avoids all of the above problems and which is at the same time reliable, accurate and inexpensive.

According to the present invention the capillary tube within which the trapped volume of test gas is compressed is straight and is open at its end. Thus cleaning is very readily accomplished. A plunger slides into the capillary tube through its open end and is sealed relative to the interior of the tube, thereby effectively closing the open end of the capillary tube so that gas may be compressed therewithin. The position of this plunger within the capillary tube may be adjusted, thereby varying the length of the tube within which gas may be compressed by, in effect, moving its closed end toward and away from the trapped volume of gas. This has a most significant effect, in that it permits the attainment of varying degrees of compression of the trapped volume of gas, thus permitting pressure measurement over a plurality of ranges, while at the same time enabling the pressures to be measured by direct reading on a linear fixed scale mounted on a cooperating part of the gauge. The same scale, in its fixed position, may be used for all operative settings of the plunger.

The piston which moves the mercury between its standby and operative positions is so mounted in the device that the space between its trailing surface and the housing wall away from which it is adapted to move is sealed, and no equilibrating passages are provided. As a result, upward movement of the piston is strongly resisted unless a vacuum is applied to the instrument, thus minimizing the possibility of faulty manipulation of the gauge.

To the accomplishment of the above, and to such other objects as may hereinafter appear, the present invention relates to the construction of a pressure measuring gauge as defined in the appended claims and as described in this specification, taken together with the accompanying drawings, in which:

FIG. 1 is a front elevational view, largely broken away and cross sectioned, showing the instrument in its standby condition ready for measurement, the plunger in the capillary tube being shown in one of its operative positions; and FIG. 2 is a view similar to FIG. 1 but showing the gauge in its measuring condition, the plunger in the capillary tube being shown in a different one of its operative positions.

The body of the instrument may, as here specifically disclosed, be of one-piece glass construction, comprising a reservoir portion 2 above which is mounted a bulb portion 4 and a capillary tube 6 the inner bore 8 of which is of closely controlled size and uniformity. A passage 10 communicates between the reservoir 2 and the bulb 4. Tube portion 12 branches out from the passages 10 above the reservoir 2 and communicates with a pair of passages 14 and 16 formed in tube portions 18 and 20 respectively, those bores 14 and 16 communicating with one another at their upper ends via passage 22, and jointly communicating with trap 24 and outlet 26. The passage 16 may be capillary in nature, with an internal diameter comparable to that of the passage 8. The outer surface of the tube 16 is provided with a measurement scale 28 fixed thereon and linearly graduated in any appropriate manner, as in millimeters of mercury, and is here shown as provided with graduations between the values of zero and 1.0. The outer surface of the tube 6 is provided with the plurality of reference marks 30, 30a, 30b, and 30c, designated respectively 0, .01, 0.1 and 1.0 respectively, those values corresponding to and being directly opposite from the corresponding values on the scale 28.

The capillary bore 8 is open at the upper end of the tube 6, and a precision ground plunger rod 32 is insertable into the bore 8 via its open end and is slidable therealong. (The rod 32 is shown in the drawings as a solid black line, for illustrative purposes.) The outer dimensions of the rod 32 are very closely the same as the corresponding inner dimensions of the bore 8 so that the rod 32 sealingly engages the inner surfaces of the bore 8. The rod 32 extends out beyond the upper end of the tube 6 and is provided with an adjustment knob 34 secured thereto in any appropriate manner, as by means of the set screw 36.

The upper end of the tube 8 is provided with a flange 38 beneath which a split retaining ring 40, formed of a suitable plastic such as polypropylene, is adapted to be received. An adapter nut 42 is received over the upper end of the tube 6 and has inwardly extending flanges adapted to engage the underside of the ring 40 and press the ring 40 against the flange 38. The upper portion of the adapter nut 42 is internally threaded, and threadedly receives screw plug 44, which may be formed of some suitable plastic such as polypropylene, and a sealing washer 46 formed of Teflon or the like is received between the screw 44 and the upper end of the tube 6. The screw 44 and the washer 46 are provided with central passages 48 and 50 respectively which register with the bore 8 and through which the rod 32 passes. When the screw 44 is screwed down into the adapter nut 42 the washer 46 is axially compressed, this causing its central passage 50 to constrict radially and grip the rod 32, thus reliably retaining that rod 32 in the axial position in which it is placed.

The reservoir 2 is open at its lower end and is there provided with flange 52. A split retaining ring 54, formed of a suitable plastic such as polypropylene, is received on top of the flange 52, and an adapter nut 56 is received thereover and has an inwardly extending flange which engages with the upper surface of the ring 54 and presses that ring 54 against the flange 52. The lower portion of the adapter nut 56 is internally threaded, and screw 58 is threadedly received therein, the upper surface of the screw 58 engaging the lower surface of the flange 52. The upper surface of the screw 58 may be provided with an annular recess 60 in which a sealing ring 62 is received, that ring 62 sealingly engaging the lower surface of the flange 52.

The screw 58 is provided with a central axial passage 64 which communicates with an internally threaded wider passage 66. A piston rod 68 slidably passes through the passage 64 and is adapted to be engaged by an O-ring 70 mounted at the axially upper end of the passage 66 and held in place by a plastic screw 72 provided with axial passage 74 through which the piston rod 68 slides. The outer end of the piston rod 68, which extends down below the screw 58, is provided with an adjusting knob 76 secured thereto in any appropriate manner, as by means of the set screw 78. The knob 76 has an upwardly extending externally threaded portion 80 adapted to be threadedly received within the passage 66. The piston rod 68 carries at its upper end a piston 82 which is slidable along the walls of the reservoir portion 2 and which sealingly engages those walls, as by means of a sealing ring 84 received with an annular peripheral groove 86 formed in the piston 82.

The action of the sealing rings 60 and 70, as well as the other structure at the lower portion of the reservoir 2, effectively prevents the entry of air between the lower surface of the piston 82 and the upper surface of the screw 58. The piston 82 is inserted into the lower end of the reservoir 2 while it is in contact with the screw 58, and the adapter nut 56 and screw 58 are then secured to the lower end of the reservoir 2 while the piston 82 remains in that position relative to the nut 58.

To prepare the instrument for measurement a supply of appropriate liquid such as the mercury 88 is caused to flow into the reservoir 2, as shown in FIG. 1, the piston 82 defining the bottom wall of the reservoir cavity 2a. Next the plunger 32 is axially adjusted along the capillary bore 8 until its lower end coincides with a selected one of the indicia 30a–c, depending upon the degree of gas compression desired. This adjustment is accomplished by loosening screw 44, sliding the plunger 32 to desired position by manipulating the knob 34, and then tightening down on the screw 44. FIG. 1 shows the plunger 32 in its lowermost operative position, with its tip in line with indicia 30a, while FIG. 2 shows the plunger 32 in its intermediate operative position with its tip in line with indicia 30b. The lower the tip of the plunger 32, the greater will be the degree of compression of the gas to be measured, as will become apparent hereinafter.

Next, with the piston 82 still in its lowermost position as shown in FIG. 1, the outlet 26 is connected, as by means of the tubing 90, to the system containing the test gas the pressure of which is to be measured. The test gas will then fill the bulb 4 and the passage 8 up to the tip of the plunger 32.

Next the piston rod 68 is moved upwardly by manipulation of the adjustment knob 76 until its externally threaded portion 80 engages the internally threaded portion 66 of the nut 58. This will force the piston 82 upwardly, thereby, in effect, constricting the reservoir cavity to a smaller volume represented by the reference numeral 2a in FIG. 2, and moving the mercury 88 up into the passages 10, 4, 8, 12, 14 and 16. When the mercury 88 reaches the bottom of the passage 10 it will trap within the bulb 4 and the capillary bore 8 a predetermined volume of the test gas, and as the mercury 88 continues to move upwardly it will compress that trapped volume of gas between itself and the tip of the plunger 32. At the same time mercury will be forced into the passages 14 and 16. The portion 80 of the adjustment knob 76 will engage the internally threaded portion 66 of the screw 58 after the trapped gas has been appreciably compressed, but before the upper level of the mercury has reached the zero indicia 30 on the tube 6. Thereafter the adjustment knob 76 will be rotated, screwing into the screw portion 66, thus providing close control of the positioning of the piston 82, that piston being moved upwardly until the level of the mercury 88 in the tube 6 reaches the zero indicia 30.

Since the gas pressure on the upper end of the mercury column in the tube 16 is lower than the pressure on the upper end of the mercury column in the tube 6, the pressure in the latter instance having been increased by reason of the compression of the trapped test gas, the level of the mercury in the tube 16 will be higher than that of the mercury in the tube 6, and the difference in level will be a measure of the difference in pressure. This difference in level can be read directly from the fixed linear scale 28.

The bore 8 is so designed, in conjunction with the indicia 30 and 30a–c, that the differences in degree of compression of the trapped gas preferably will vary in factors of ten, as is indicated by the indicia 30a–c, which are marked respectively .01, 0.10 and 1.0. If the plunger 32 is in its position shown in FIG. 1, with its tip in registration with indicia 30a, this representing the greatest degree of compression of the trapped test gas, the value read on the scale 28 will be multiplied by a factor of .01 to give a reading in millimeters of mercury. Similarly, if the plunger 32 is so positioned that its tip corresponds with the indicia 30b or 30c, then the value read on scale 28 will be multiplied by factors 0.1 or 1.0 to give a reading in millimeters of mercury. Because the zero reference mark 30 for the capillary tube 8 remains stationary while the effective length of the bore 8 is adjusted in order to vary the degree of compression of the trapped volume of gas, the scale 28 can be linear in nature and need not be moved as the plunger 32 is adjusted to adjust the range of measurement of the gauge.

If the capillary bore 8 is to be cleaned, all that need be done is to remove the screw 44 and withdraw the plunger rod 32. Free access to the straight capillary bore 8 is then afforded from the top of the tube 6.

Since, as has been described, the space between the piston 82 and the screw 58 is effectively sealed against the entry of gas thereinto, any movement of the piston 82 away from the screw 58 will cause a vacuum to form between those elements, and hence upward movement of the piston 82 will be strongly resisted unless the pressure applied to the upper surface of the mercury 88 is very low. This will make it difficult to move the piston 82 upwardly unless the outlet 26 is connected to a source of low pressure, and hence will make it unlikely that mercury can be forced into the capillary bore 8 except when measurement of low pressure gases is being carried out.

Through the use of the structure here disclosed a McLeod type gauge is produced in which the capillary passage within which the trapped volume of gas is compressed is provided with an adjustably positionable closed end, thus permitting multiple selection of measurement ranges while using a single fixed linear measurement scale 28. Since the adjustable plunger 32 is removable from the capillary bore 8 via the open end thereof, cleaning of all parts of the gauge, and particularly the capillary bore 8, is facilitated. The vacuum sealing of the piston 82 minimizes the possibility of misuse of the gauge. The use of an adjustable closed end capillary tube 8 together with the movable piston 82 eliminates the possibility of troublesome mercury displacement in the event of sudden release of vacuum. The entire device is compact, simple, and easily manufactured, and provides for measurement to a high degree of accuracy.

While but a single embodiment of the present invention has been here specifically disclosed, it will be apparent that many variations may be made in the details thereof, all within the scope of the invention as defined in the following claims.

I claim:

1. In a pressure-measuring gauge comprising a fluid reservoir and, in communication therewith, a fluid passage means comprising a bulb in communication with a narrow passage formed in a member, and means for applying thereto a compressible fluid the pressure of which is to be measured; the improvement which comprises a body slidably received in said narrow passage along a portion of said passage on the other side of said bulb from said fluid reservoir and there sealingly engaging said passage, and means operatively connected to said body for adjusting the position thereof and of its sealing engagement along said narrow passage and thereby varying the effective length of said passage into which said fluid is receivable.

2. The gauge of claim 1, in which said fluid reservoir comprises side walls and a back wall remote from said fluid passage means, a piston sealingly movable along said side walls from a position in substantial abutment with said back wall to a position remote therefrom, said piston in moving from its first mentioned position to its second mentioned position thereby reducing the effective volume of said reservoir, means sealing the open space between said piston and said back wall against the entry of fluid thereinto, and means operatively connected to said piston for moving it as described.

3. In a pressure-measuring gauge comprising a fluid reservoir and, in communication therewith, a fluid passage means comprising a bulb in communication with a narrow passage formed in a member, and means for applying thereto a compressible fluid the pressure of which is to be measured; the improvement which comprises said narrow passage being open at its end remote from said bulb, a body slidably received in said narrow passage via said remote open end along a portion of said passage on the other side of said bulb from said fluid reservoir and there sealingly engaging said passage, and means operatively connected to said body for adjusting the position thereof and of its sealing engagement along said narrow passage and thereby varying the effective length of said passage into which said fluid is receivable.

4. In a pressure-measuring gauge comprising a fluid reservoir and, in communication therewith, first and second fluid passage means, said first means comprising a bulb in communication with a first narrow passage formed in a member, said second means comprising an element defining a second narrow passage in fixed spatial relation to said first narrow passage, and means in communication with said second fluid passage means for applying thereto a compressible fluid the pressure of which is to be measured; the improvement which comprises said first narrow passage being open at its end remote from said bulb, an elongated body slidably received in and removable from said first narrow passage via said remote open end along a portion of said passage on the other side of said bulb from said fluid reservoir and there sealingly engaging said passage, and means operatively connected to said body for adjusting the position thereof and of its sealing engagement along said first narrow passage and thereby varying the effective length of said passage into which said fluid is receivable.

5. In a pressure-measuring gauge comprising a fluid reservoir and, in communication therewith, first and second fluid passage means, said first means comprising a bulb in communication with a first narrow passage formed in a member, said second means comprising an element defining a second narrow passage in fixed spatial relation to said first narrow passage, and means in communication with said second fluid passage means for applying thereto a compressible fluid the pressure of which is to be measured; the improvement which comprises said first narrow passage being open at its end remote from said bulb, a body slidably received in said first narrow passage via said remote open end along a portion of said passage on the other side of said bulb from said fluid reservoir and there sealingly engaging said passage, said body extending beyond said end of said member, and means operatively connected to the portion of said body extending beyond said remote open end of said member for adjusting the position thereof and of its sealing engagement along said first narrow passage and thereby varying the effective length of said passage into which said fluid is receivable.

6. In a pressure-measuring gauge comprising a fluid reservoir and, in communication therewith, first and second fluid passage means, said first means comprising a bulb in communication with a first narrow passage formed in a member, said second means comprising an element defining a second narrow passage in fixed spatial relation to said first narrow passage, and means in communication with said second fluid passage means for applying thereto a compressible fluid the pressure of which is to be measured; the improvement which comprises said first narrow passage being open at its end remote from said bulb, an elongated body slidably received in and removable from said first narrow passage via said remote open end along a portion of said passage on the other side of said bulb from said fluid reservoir and there sealingly engaging said passage, said body extending beyond said end of said member, means operatively connected to the portion of said body extending beyond said remote open end of said member for adjusting the position thereof and of its sealing engagement along said first narrow passage and thereby varying the effective length of said passage into which said fluid is receivable, and means operatively connected to said body for securing it in adjusted position.

7. In a pressure-measuring gauge comprising a fluid reservoir and, in communication therewith, a fluid passage means comprising a bulb in communication with a narrow passage formed in a member, and means for applying thereto a compressible fluid the pressure of which is to be measured; the improvement which comprises said narrow passage being open at its end remote from said bulb, an elongated body slidably received in and removable from said narrow passage via said remote open end along a portion of said passage on the other side of said bulb from said fluid reservoir and there sealingly engaging said passage, said body extending beyond said end of said member, and means operatively connected to the portion of said body extending beyond said remote open end of said member for adjusting the position thereof and of its sealing engagement along said first narrow passage and thereby varying the effective length of said passage into which said fluid is receivable.

8. In a pressure-measuring gauge comprising a fluid reservoir and, in communication therewith, a fluid passage means comprising a bulb in communication with a narrow passage formed in a member, for applying thereto a compressible fluid the pressure of which is to be measured; the improvement which comprises said first narrow passage being open at its end remote from said bulb, an elongated body slidably received in and removable from said first narrow passage via said remote open end along a portion of said passage on the other side of said bulb from said fluid reservoir and there sealingly engaging said passage, said body extending beyond said end of said member, means operatively connected to the portion of said body extending beyond said remote open end of said member for adjusting the position thereof and of its sealing engagement along said first narrow passage and thereby varying the effective length of said passage into which said fluid is receivable, and means operatively connected to said body for securing it in adjusted position.

9. In a pressure-measuring gauge comprising a fluid reservoir and, in communication therewith, a fluid passage means comprising a bulb in communication with a narrow passage formed in a member, and means for applying thereto a compressible fluid the pressure of which is to be measured; the improvement which comprises said first narrow passage being open at its end remote from said bulb, an elongated body slidably received in and removable from said first narrow passage via said remote open end along a portion of said passage on the other side of said bulb from said fluid reservoir and there sealingly engaging said passage, said body extending beyond said end of said member, means operatively connected to the portion of said body extending beyond said remote open end of said member for adjusting the position thereof and of its sealing engagement along said first narrow passage and thereby varying the effective length of said passage into which said fluid is receivable, and means carried by said member and operatively connected to said body for securing it in adjusted position.

10. The gauge of claim 9 in which said fluid reservoir comprises side walls and a back wall remote from said fluid passage means, a piston sealingly movable along said side walls from a position in substantial abutment with said back wall to a position remote therefrom, said piston in moving from its first mentioned position to its second mentioned position thereby reducing the effective volume of said reservoir, means sealing the open space between said piston and said back wall against the entry of fluid thereinto, and means operatively connected to said piston for moving it as described.

11. In a pressure-measuring gauge comprising a fluid reservoir and, in communication therewith, first and second fluid passage means, said first means comprising a bulb in communication with a first narrow passage formed in a member, said second means comprising an element defining a second narrow passage in fixed spatial relation to said first narrow passage, and means in communication with said second fluid passage means for applying thereto a compressible fluid the pressure of which is to be measured; the improvement which comprises said fluid reservoir comprising side walls and a back wall remote from said fluid passage means, a piston sealingly movable along said side walls from a position in substantial abutment with said back wall to a position remote therefrom, said piston in moving from its first mentioned position to its second mentioned position thereby reducing the effective volume of said reservoir, means sealing the open space between said piston and said back wall against the entry of fluid thereinto, and means operatively connected to said piston for moving it as described.

12. In a pressure-measuring gauge comprising a fluid reservoir and, in communication therewith, first and second fluid passage means, said first means comprising a bulb in communication with a first narrow passage formed in a member, said second means comprising an element defining a second narrow passage in fixed spatial relation to said first narrow passage, and means in communication with said second fluid passage means for applying thereto a compressible fluid the pressure of which is to be measured; the improvement which comprises said first narrow passage being open at its end remote from said bulb, and a closure removably attached to said member for sealingly closing the end of said first narrow passage remote from said bulb, said fluid reservoir comprising side walls and a back wall remote from said fluid passage means, a piston sealingly movable along said side walls from a position in substantial abutment with said back wall to a position remote therefrom, said piston in moving from its first mentioned position to its second mentioned position thereby reducing the effective volume of said reservoir, means sealing the open space between said piston and said back wall against the entry of fluid thereinto, and means operatively connected to said piston for moving it as described.

13. In a pressure-measuring gauge comprising a fluid reservoir and, in communication therewith, a fluid passage means comprising a bulb in communication with a narrow passage formed in a member, and means for applying thereto a compressible fluid the pressure of which is to be measured; the improvement which comprises a body sealingly slidably received in said narrow passage, and means operatively connected to said body for adjusting the position thereof along said narrow passage, said fluid reservoir comprising side walls and a back wall remote from said fluid passage means, a piston sealingly movable along said side walls from a position in substantial abutment with said back wall to a position remote therefrom, said piston in moving from its first mentioned position to its second mentioned position thereby reducing the effective volume of said reservoir, means sealing the open space between said piston and said back wall against the entry of fluid thereinto, and means operatively connected to said piston for moving it as described.

14. In a pressure measuring gauge comprising a fluid reservoir and, in communication therewith, a fluid passage means comprising a bulb in communication with a narrow passage formed in a member, and means for applying thereto a compressible fluid the pressure of which is to be measured; the improvement which comprises said first narrow passage being open at its end remote from said bulb, an elongated body sealingly slidably received in and removable from said first narrow passage via said remote open end and extending beyond said end of said member, means operatively connected to the portion of said body extending beyond said remote open end of said member for adjusting the position thereof along said first narrow passage, and means carried by said member and operatively connected to said body for securing it in adjusted position, said fluid reservoir comprising side walls and a back wall remote from said fluid passage means, a piston sealingly movable along said side walls from a position in substantial abutment with said back wall to a position remote therefrom, said piston in moving from its first mentioned position to its second mentioned position thereby reducing the effective volume of said reservoir, means sealing the open space between said piston and said back wall against the entry of fluid thereinto, and means operatively connected to said piston for moving it as described.

References Cited in the file of this patent
UNITED STATES PATENTS

| | | |
|---|---|---|
| 1,168,518 | Lewis | Jan. 18, 1916 |
| 1,252,656 | Breen | Jan. 8, 1918 |
| 1,595,021 | Plunkett | Aug. 3, 1926 |
| 1,984,994 | Rose | Dec. 18, 1934 |
| 3,035,600 | Gilmont | May 22, 1962 |

OTHER REFERENCES

Manostat Corp. Bulletin VG, "Open End McLeod Gauge," copyright 1959.